United States Patent
Miller et al.

(10) Patent No.: US 7,063,456 B2
(45) Date of Patent: Jun. 20, 2006

(54) CONTAINER FOR A BLENDER

(75) Inventors: Brent A. Miller, Duncansville, PA (US); Richard D. Boozer, Wakeman, OH (US); Michael D. Anton, Olmsted Township, OH (US)

(73) Assignee: Vita-Mix Corporation, Cleveland, OH (US)

( * ) Notice: Subject to any disclaimer, the term of this patent is extended or adjusted under 35 U.S.C. 154(b) by 119 days.

(21) Appl. No.: 10/481,969

(22) PCT Filed: Jun. 5, 2002

(86) PCT No.: PCT/US02/17827

§ 371 (c)(1),
(2), (4) Date: Dec. 17, 2003

(87) PCT Pub. No.: WO03/001954

PCT Pub. Date: Jan. 9, 2003

(65) Prior Publication Data

US 2004/0159624 A1    Aug. 19, 2004

Related U.S. Application Data

(60) Provisional application No. 60/301,081, filed on Jun. 26, 2001.

(51) Int. Cl.
*A47J 43/046* (2006.01)

(52) U.S. Cl. .................. 366/205; 366/306; 366/307; 366/314

(58) Field of Classification Search ............... 366/205, 366/206, 314, 306–307; 241/282.1, 282.2; 99/348
See application file for complete search history.

(56) References Cited

U.S. PATENT DOCUMENTS

| | | | | |
|---|---|---|---|---|
| 2,086,858 A | | 7/1937 | Dunkelberger | |
| 2,282,866 A | | 5/1942 | Hagen | |
| 2,628,081 A | | 2/1953 | Laird | |
| 2,711,644 A | * | 6/1955 | Myers | 73/19.09 |
| 2,774,576 A | * | 12/1956 | Frank, Sr. | |
| 2,798,701 A | * | 7/1957 | Collura | 366/205 |
| 2,860,550 A | * | 11/1958 | Stark | 162/261 |
| 2,897,862 A | * | 8/1959 | Malz et al. | 241/199.12 |
| 2,924,349 A | * | 2/1960 | Huck | 215/382 |
| 3,064,949 A | * | 11/1962 | Dewenter | 241/195 |
| 3,175,594 A | * | 3/1965 | Jepson et al. | 241/199.12 |
| 3,216,473 A | | 11/1965 | Dewenter | |

(Continued)

FOREIGN PATENT DOCUMENTS

DE    19539382 C1  *  1/1997

(Continued)

*Primary Examiner*—Charles E. Cooley
(74) *Attorney, Agent, or Firm*—Renner, Kenner, Greive, Bobak, Taylor & Weber

(57) ABSTRACT

A container (15) for a blender (10) includes a bottom surface (16) having a non-symmetrically shaped perimeter. A side wall (17) extends upwardly from the perimeter of the bottom surface (16). A mixing blade assembly (20) having a plurality of blades (21) is located above the bottom surface (16) and is rotatable on an axis which is displaced from the center of the bottom surface (10). Nonuniform spaces (25, 26) are thus created between the ends of the blades (21) and the side wall (17). The bottom surface (16) is inclined at an angle relative to the plane normal to the axis of rotation of the blade assembly (20), and it, as well as the side wall (17), may be provided with a plurality of spaced vanes (31, 32).

17 Claims, 3 Drawing Sheets

U.S. PATENT DOCUMENTS

| | | | | |
|---|---|---|---|---|
| 3,223,486 A | * | 12/1965 | Holl, Jr. et al. | 422/82 |
| 3,240,246 A | | 3/1966 | Dewenter | |
| 3,342,425 A | * | 9/1967 | Morton | 241/46.17 |
| 3,612,126 A | * | 10/1971 | Emmons et al. | |
| 3,627,008 A | * | 12/1971 | Samuelian | 241/199.12 |
| 3,873,435 A | * | 3/1975 | Ziebarth et al. | 204/222 |
| 4,087,053 A | * | 5/1978 | Voglesonger | 241/282.1 |
| 4,664,530 A | | 5/1987 | Kurome et al. | |
| 4,891,966 A | | 1/1990 | Kramer | |
| 4,911,557 A | * | 3/1990 | Dormer et al. | 366/299 |
| 4,981,365 A | * | 1/1991 | Bow et al. | |
| 5,323,973 A | | 6/1994 | Ferrara, Jr. | |
| 5,360,176 A | * | 11/1994 | Mugge et al. | 241/282.1 |
| 5,487,511 A | * | 1/1996 | Sansone et al. | 241/282.1 |
| 5,616,083 A | * | 4/1997 | Subbaraman et al. | |
| 5,660,468 A | * | 8/1997 | Okajima et al. | 366/306 |
| 6,390,665 B1 | * | 5/2002 | Silveria | 366/307 |
| 6,854,876 B1 | * | 2/2005 | Dickson, Jr. | 366/205 |
| 2005/0018534 A1 | * | 1/2005 | Nikkah | 366/205 |

FOREIGN PATENT DOCUMENTS

| | | | |
|---|---|---|---|
| GB | 2398733 | * | 9/2005 |
| JP | 1-145030 | * | 6/1989 |
| JP | 1-145031 | * | 6/1989 |
| JP | 1-310616 | * | 12/1989 |
| JP | 3-193013 | * | 8/1991 |
| JP | 4-17820 | * | 1/1992 |
| JP | 6-178734 | * | 6/1994 |
| JP | 9-37970 | * | 2/1997 |
| WO | 96/15706 | * | 5/1996 |
| WO | 03/001954 | * | 1/2005 |

* cited by examiner

FIG.3
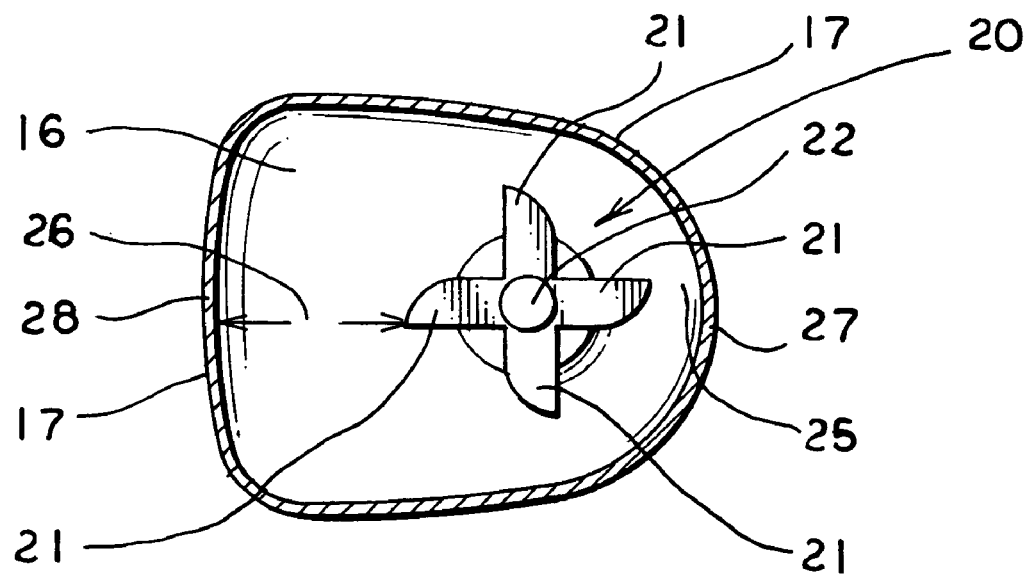
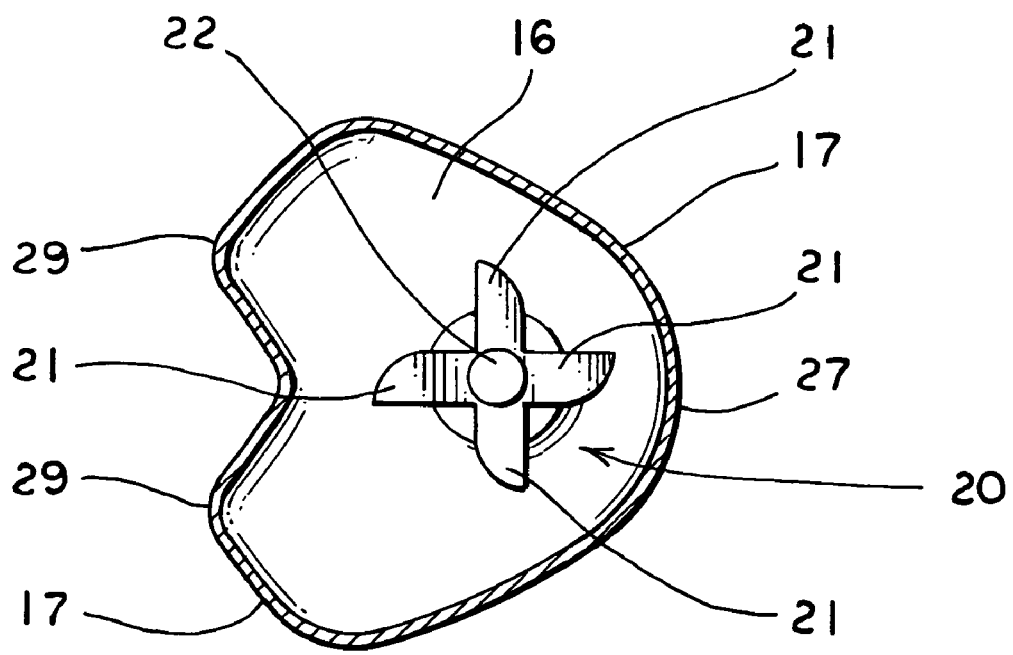
FIG.4

CONTAINER FOR A BLENDER

CROSS REFERENCE TO RELATED APPLICATIONS

This application is based on International Patent Application No. PCT/US02/17827 filed on Jun. 5, 2002, which claims priority from U.S. Provisional Patent Application Ser. No. 60/301,081 filed Jun. 26, 2001.

TECHNICAL FIELD

This invention relates to a container used to blend liquids, foods and the like. More particularly, this invention relates to a blending container which is especially adapted to more efficiently blend highly viscous liquids such as encountered in the preparation of frozen drinks.

BACKGROUND ART

Food processors, oftentimes referred to as blenders, are employed to mix or otherwise blend or process a wide variety of foods. In a typical blender, a container is provided with a blade assembly having a plurality of blades near the bottom thereof which are rotated by a motor situated in a base or pedestal on which the container is placed. The bottom of the container is typically formed flat with a regularly-shaped perimeter, for example, a square or a circle, and the blades are rotatable in the center of that regular configuration. As such, a wide variety of ingredients can be blended in these containers including hot liquids, cold liquids, and solids such as ice, fruits and the like.

The blending of most liquids is accomplished by the action of the rotating blades whereby the fluid is drawn down through the blades, generally near the center thereof. The fluid then returns to the main body of the container by passing upwardly through the gap between the circumferential tip of the blades and the perimeter of the container. Such is an acceptable flow path when dealing with non-viscous fluids; however, when dealing with viscous fluids, such as are prevalent in frozen drinks, for example, smoothies or the like, flow problems are created. Specifically with such fluids, recirculation a significant distance vertically above the blades is not accomplished and a fluid or ice bridge is formed above the blades. As a result, the blades are spinning in a pocket of air and blending is thwarted. When such occurs, the user must usually manually stir the fluid or otherwise break the bridge to force the ingredients down toward the blades. However, with many viscous fluids, the bridge will again form requiring further user intervention. The blending of viscous fluids without manual intervention thus remains a problem in the food processing art.

DISCLOSURE OF THE INVENTION

It is thus an object of the present invention to provide a container for a blender which assures a more complete blending of the ingredients being mixed.

It is a further object of the present invention to provide a container for a blender, as above, which creates an irregular flow pattern to discourage the formation of an air pocket around the blades in the container of the blender.

It is another object of the present invention to provide a container for a blender, as above, which will effectively mix viscous fluids without the need for manual user intervention.

These and other objects of the present invention, as well as the advantages thereof over existing prior art forms, which will become apparent from the description to follow, are accomplished by the improvements hereinafter described and claimed.

In general, a container for a blender made in accordance with one aspect of the present invention includes a bottom surface having a side wall extending upwardly therefrom. A rotatable mixing blade assembly is positioned above the bottom surface, the blade assembly being displaced from the center of the bottom surface.

In accordance with another aspect of the present invention, the container includes a bottom surface having a non-symmetrically shaped perimeter. A side wall extends upwardly from the perimeter of the bottom surface, and a rotatable mixing blade assembly is positioned above the bottom surface.

In accordance with yet another aspect of the present invention, the container includes a bottom surface having a side wall extending upwardly therefrom. A mixing blade assembly is rotatable on an axis and is positioned above the bottom surface. The bottom surface is inclined at an angle relative to the plane normal to the axis of rotation of the blender assembly.

A preferred exemplary container for a blender incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 3 is a sectional view taken substantially along line 3—3 of FIG. 2.

FIG. 4 is a sectional view similar to FIG. 3 but showing an alternative embodiment.

PREFERRED EMBODIMENT FOR CARRYING OUT THE INVENTION

Figure 1:
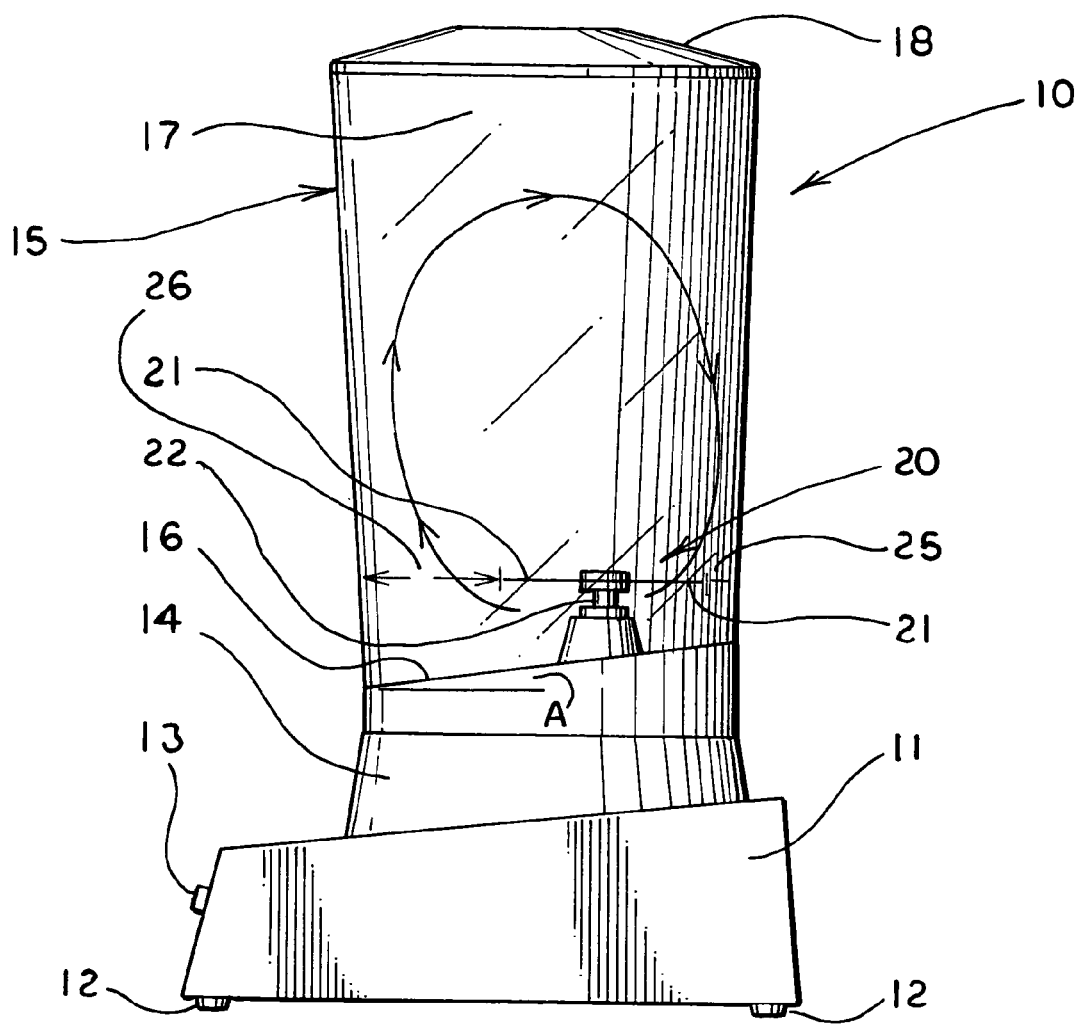
FIG. 1 is a somewhat schematic side elevational view of a blender having a container made in accordance with the concepts of the present invention.
Figure 2:
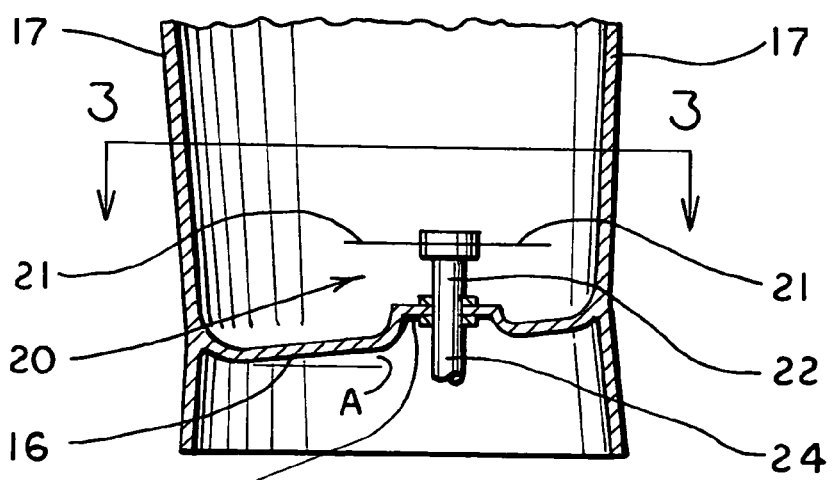
FIG. 2 is a somewhat schematic, fragmented vertical sectional view of the container shown in FIG. 1.

A blender is shown schematically in FIG. 1 and is indicated generally by the numeral 10. Blender 10 includes a base portion 11 which, via feet 12, may rest on any suitable operating surface. Base 11 houses a motor and other controls which may be operated at a control panel 13. A pedestal 14 is carried by base portion 11 and is adapted to receive the container made in accordance with the present invention and generally indicated by the numeral 15.

Container 15 includes a bottom surface 16 with a side wall 17 extending upwardly from the perimeter of the bottom surface 16. Side wall 17 is quite often transparent and generally defines an open top for container 15 which can be closed, as desired, by a cover or lid 18. Container 15 is most often provided with a handle (not shown) on the side wall, and usually a spout is formed at the top perimeter of the side wall so that liquid may readily be poured out of container 15.

A blade assembly, generally indicated by the numeral 20, is positioned within container 15 above bottom surface 16. Blade assembly 20 can be of a conventional blender blade configuration and, as such, includes a plurality of radially extending blades 21 which are carried by, and positioned above bottom surface 16 by, a vertically oriented shaft 22. Shaft 22 extends downwardly through a hub 23 formed in container bottom surface 16 and is typically connected, as by a spline, to a motor shaft 24. As is rather conventional for blenders, placement of container 15 on pedestal 14 automatically makes a connection between blade assembly 20 and the motor of the blender such that upon activation of the motor, the rotation of motor shaft 24 is transferred to blade shaft 22, and blades 21 are rotated above bottom surface 16 of container 15.

Figure 6:
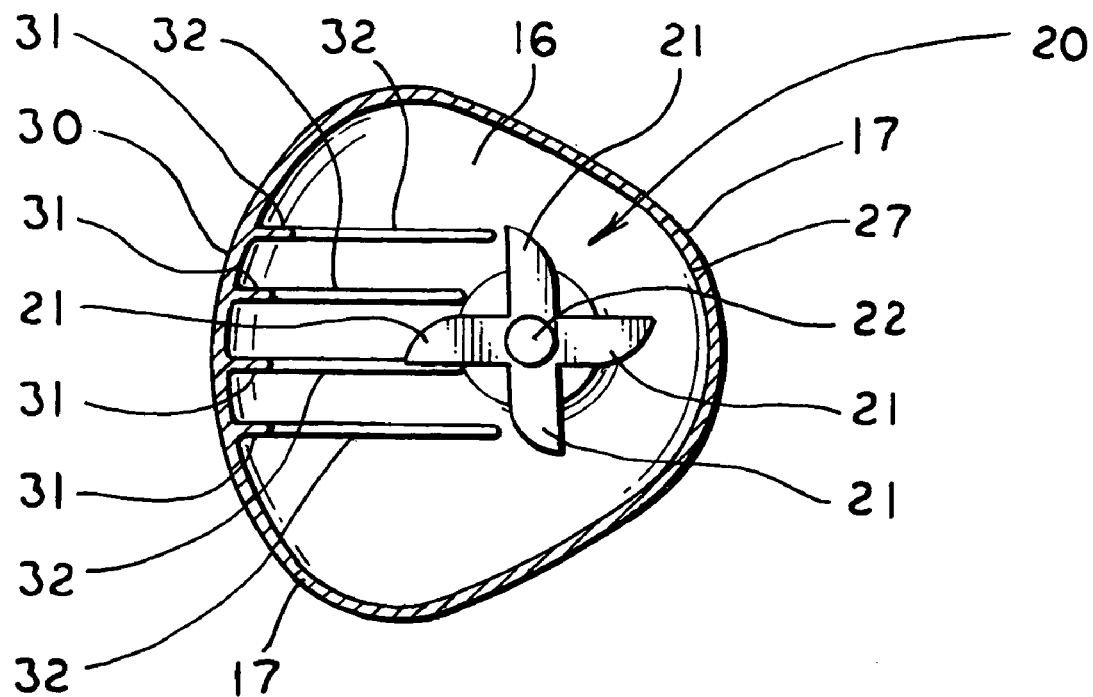
FIG. 6 is a sectional view taken substantially along line 6—6 of FIG. 5.

The container 15 of the present invention includes several features which enable it to more efficiently blend ingredients which were heretofore difficult to blend, such as frozen or viscous fluids. One of those features relates to the position of the blade assembly 20 in container 15. As shown in the drawings, blade assembly 20 is not centered relative to bottom surface 16. That is, irrespective of the shape of surface 16, be it circular, square, rectangular, or a non-symmetrical shape such as shown in FIGS. 3, 4 and 6, the axis of rotation of blades 21, as defined by shaft 22, is not positioned on the centroid of the bottom surface 16.

As a result, a fluid flow pattern, shown by the arrows in FIG. 1, is created. This flow pattern is to be contrasted with the flow pattern of the prior art wherein the fluid exits the blades at the small area between their tips and the side wall of the container and moves uniformly upwardly as a thin sheet along the walls of the container. The fluid in the prior art is thereafter turned near the top thereof and redirected down toward the center of the rotating blades. It is this uniform movement, however, which assists in creating the bridge which forms the air pocket around the blades.

The new nonuniform flow pattern shown in FIG. 1 avoids the problems of the prior art. That is, because the clearance between the tips of blades 21 and the nearer side wall 17, indicated as 25 in the drawings, is minuscule, as compared to the clearance 26 between the side wall 17 further away from blades 21, fluid flow upwardly at clearance 25 is essentially eliminated with the bulk of the upward movement of the fluid being directed through clearance 26 in one relatively large concentrated stream. This up-flow therefore occurs only over a portion of the circumference of blades 21, and uninterrupted down flow through the blades will occur around the remaining portion of the circumference. Such a nonuniform, non-symmetrical or unbalanced flow will disrupt the tendency of the fluid to form the undesirable bridge.

Another factor which contributes to the desired nonuniform flow created by the present invention is the fact that, in the preferred embodiment, the shape of bottom surface 16 is non-symmetrical or otherwise irregular. That is, while a desirable flow can be created with an off-centered blade assembly 20 and a regularly configured or symmetrical bottom surface 16, the desired flow can be enhanced by, and in fact, even independently created by, a bottom surface 16 which is irregular or non-symmetrical in configuration.

Examples of such non-symmetrical bottom surfaces 16 are shown in FIGS. 3, 4 and 6. That shown in FIG. 3 is currently most preferred. In general, the FIG. 3 configuration is somewhat like a flattened ellipse having a curved area 27 on the side nearest to the axis 22 of blade assembly 20 and a flattened area 28 on the side further from the axis 22 of blade assembly 20.

In the example shown in FIG. 4, the flattened area 28 shown in FIG. 3 has been modified to provide for two lobes 29, rendering the overall configuration generally heart-shaped. And in FIG. 6, the flattened area 28 has been rounded, as at 30, to provide an overall configuration of generally a teardrop shape.

It should be noted that a common feature of all of these configurations is the curved area 27 on the side of bottom surface 16 adjacent to blade assembly 20. In fact, as can be observed, the radius of curvature of area 27 generally approximates the curvature of the circle that the tips of blades 21 transcribe when rotating. As such, the small clearance 25 is defined opposite to the direction of greatest displacement of blade assembly 20 from the centroid of the bottom surface 16, and the large clearance 26 is in the direction of the greatest displacement of blade assembly 20 from that centroid. This changing clearance further contributes to the preferred flow because at small clearance area 25, flow exiting the blades is unable to squeeze back through the small gap, but rather is swept around under the blade to escape at area 26 having the larger clearance.

An additional feature which contributes to the nonuniform flow is the fact that in the preferred embodiment, bottom surface 16 is inclined at an angle A relative to the plane normal to the axis of rotation of blade assembly 20. That is, bottom surface 16 is not horizontal and does not intersect shaft 22 of blade assembly 20 at a right angle. In other words, bottom surface 16 may be generally planar and inclined at an angle relative to horizontal. Further, as is evident from FIGS. 1, 3 and 4, bottom surface 16 may be uninterrupted except for blade assembly 20. While bottom surface 16 is shown as a continuous member being oriented at angle A from horizontal, it should be evident that it need not be in a single plane but rather could be made up of a plurality of stepped regions creating the overall angled surface.

Thus, bottom surface 16 slopes downwardly at angle A from the location of blade assembly 20 toward the side of container 15 furthest away from blade assembly 20. That is, bottom surface 16 is the lowest at the area of the largest blade clearance 26. As such, the sloped bottom generates a force exiting blades 21 which is the sine of angle A, this force being parallel to the bottom surface 16 and in the direction away from the axis of rotation of blades 21 which thereby enhances the flow in that direction as previously described. Although the exact extent of angle A is not critical, it has currently been found that an angle A of about ten degrees will provide the desired results.

In addition to improving or enhancing the desired flow, as previously described, the sloped bottom surface 16 provides additional blending benefits. By virtue of the sloped bottom surface 16, the distance between each blade 21 and the bottom surface 16 will vary as the blades rotate. As a result, the blades 21 will experience a variation in load as they rotate, which variation repeats itself with each revolution. As such, there is a repeating circumferential hydraulic imbalance which improves the pumping action of the blades, which creates additional desirable turbulence in the container 15, and which further enhances the net movement in the direction of the arrow in FIG. 1, as previously described.

In summary as to the foregoing, at least three factors of the present invention enhance the flow in the blending of viscous fluids. These factors are the off-center blade assembly, the non-symmetrical bottom surface and the sloped bottom surface, which may singly, or in combination, enhance the flow pattern.

Figure 5:
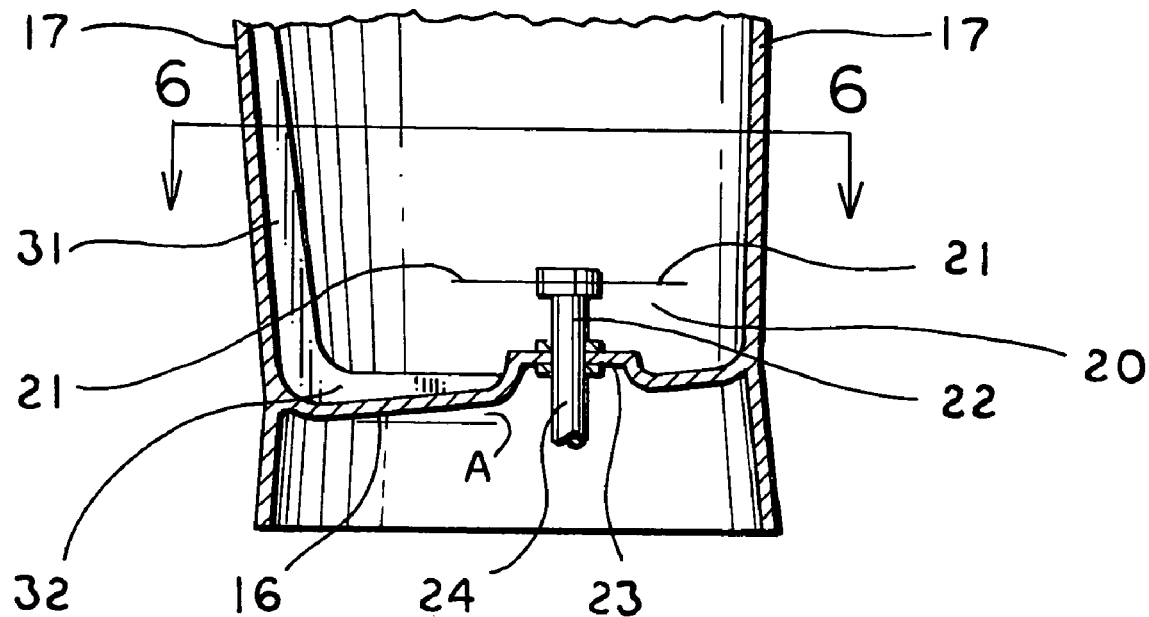
FIG. 5 is a somewhat schematic, fragmented vertical sectional view similar to FIG. 2 but showing an alternative embodiment.

In addition to these three features, even further blending optimization may be obtained by forming a plurality of adjacent vanes 31 on the portion of side wall 17 furthest away from blade assembly 20. Side wall vanes 31 preferably continue and extend along bottom surface 16 as bottom vanes 32, as shown in FIGS. 5 and 6. These vanes 31 and 32 will reduce the tendency of the created flow from swirling and will focus the discharge flow from blades 21 into a concentrated stream of upwardly moving fluid. This stream then provides the majority of the unbalanced force to discourage the formation of the bridge.

In light of the foregoing, it should thus be evident that a blender container constructed as described herein substantially improves the art and otherwise accomplishes the objects of the present invention.

What is claimed is:

1. A container for a blender comprising a bottom surface, a side wall extending upwardly from said bottom surface, a rotatable mixing blade assembly positioned above said bottom surface, said blade assembly being displaced from the center of said bottom surface, and a plurality of spaced vanes formed on a portion of said side wall generally furthest away from said blade assembly, wherein said bottom surface has a non-symmetrically shaped perimeter.

2. The container of claim 1 wherein said blade assembly includes a plurality of radially extending blades having tips, the distance between a tip of a blade and said side walls varying as said blades rotate.

3. The container of claim 1 wherein said vanes continue onto said bottom surface.

4. The container of claim 1 wherein said blade assembly is rotatable on an axis and said bottom surface is inclined at an angle relative to a plane normal to said axis.

5. A container for a blender comprising a bottom surface having a generally elliptical perimeter having a curved area and an opposed flattened area, a side wall extending upwardly from the perimeter of said bottom surface, and a rotatable mixing blade assembly positioned above said bottom surface and being rotatable on an axis, the axis being further away from said flattened area than said curved area.

6. The container of claim 5 wherein said curved area has a radius, said blade assembly including a plurality of blades having tips, said radius approximating the circle transcribed by the tips of said blades as they are rotating.

7. The container of claim 5 wherein said blade assembly is rotatable on an axis and said bottom surface is inclined at an angle relative to a plane normal to said axis.

8. The container of claim 5 further comprising a plurality of spaced vanes formed in said side wall.

9. The container of claim 8 wherein said vanes continue onto said bottom surface.

10. A container for a blender comprising a generally planar bottom surface, a side wall extending upwardly from said bottom surface, and a mixing blade assembly positioned above said bottom surface, said bottom surface being inclined at an angle relative to horizontal and being uninterrupted except for said blade assembly.

11. The container of claim 10 wherein said blade assembly is rotatable on an axis and the lowest area of said bottom surface is furthest away from said axis.

12. The container of claim 10 wherein said blade assembly is rotatable on an axis and said bottom surface slopes downwardly toward said side wall which is furthest away from said axis.

13. The container of claim 10 wherein said angle is approximately ten degrees.

14. The container of claim 10 further comprising a plurality of spaced vanes formed in said side wall.

15. The container of claim 14 wherein said vanes continue onto said bottom surface.

16. A container for a blender comprising a bottom surface, a side wall extending upwardly from said bottom surface, a mixing blade assembly positioned above said bottom surface and rotatable on an axis, said bottom surface being inclined at an angle relative to a plane normal to said axis, and a plurality of spaced vanes formed on said side wall and continuing onto said bottom surface, said vanes on said side wall and said vanes on said bottom surface meet at the lowest point of said bottom surface.

17. A container for a blender comprising a bottom surface having a non-symmetrically shaped perimeter, a side wall extending upwardly from the perimeter of said bottom surface, a mixing blade assembly positioned above said bottom surface and rotatable on an axis which is displaced from the center of said bottom surface, said bottom surface being inclined at an angle relative to the plane normal to said axis.

* * * * *